United States Patent [19]
Staton et al.

[11] Patent Number: 5,457,995
[45] Date of Patent: Oct. 17, 1995

[54] HORIZONTAL BORING PIPE PENETRATION DETECTION SYSTEM AND METHOD

[75] Inventors: Raymon R. Staton, Kansas City; William O. Peck, Lawson, both of Mo.

[73] Assignees: Northern Pipeline Const., Ariz.; Western Resources, Kans.

[21] Appl. No.: 246,155

[22] Filed: May 19, 1994

[51] Int. Cl.$^6$ .............................. G01H 17/00; G01S 03/80
[52] U.S. Cl. .............................. 73/596; 73/784; 73/40.5 A
[58] Field of Search .............................. 73/584, 592, 596, 73/594, 85, 78, 104, 152, 40.5 A; 181/108, 121, 177, 125

[56] References Cited

U.S. PATENT DOCUMENTS

| | | |
|---|---|---|
| 2,620,386 | 12/1952 | Alspaugh . |
| 4,016,942 | 4/1977 | Wallis ........................ 175/45 |
| 4,167,290 | 9/1979 | Yamazaki ........................ 175/50 |
| 4,429,575 | 2/1984 | Akishika ........................ 73/598 |
| 4,457,163 | 7/1984 | Jackle ........................ 73/40.5 |
| 4,646,277 | 2/1987 | Bridges ........................ 175/26 |
| 4,911,012 | 3/1990 | Ziska ........................ 73/584 |
| 5,036,497 | 7/1991 | Heitman ........................ 73/584 |
| 5,127,267 | 7/1992 | Huebler ........................ 73/584 |

*Primary Examiner*—Hezron E. Williams
*Assistant Examiner*—Helen C. Kwok
*Attorney, Agent, or Firm*—LaValle D. Ptak

[57] ABSTRACT

A method and apparatus for detecting pipe penetration by the bore head of horizontal boring machine utilizes acoustic and seismic sensors. A sensitive acoustic microphone is placed in the bottom of the nearest sewer manhole to the location of the bore head to detect acoustic signals transmitted through the ground by the bore head for producing a first output signal. A seismic pickup device is placed in the vicinity of the bore head to detect vibrations of the ground caused by the bore head, as it moves through the ground, to produce a second output signal. These first and second signals produced, respectively, by the microphone and the seismic pick-up device, then are supplied to a two-channel strip chart recorder, which provides an output indicia permitting simultaneous comparison of the two signals. Particular patterns of these detected signals are indicative of the penetration of a sewer pipe. In addition to these two signals, analysis of the pressure on the bore head by the boring machine also may be made and compared with the output signals produced by the microphone and seismic pick-up device, as a further input to determine whether penetration of a sewer pipe has been effected.

15 Claims, 1 Drawing Sheet

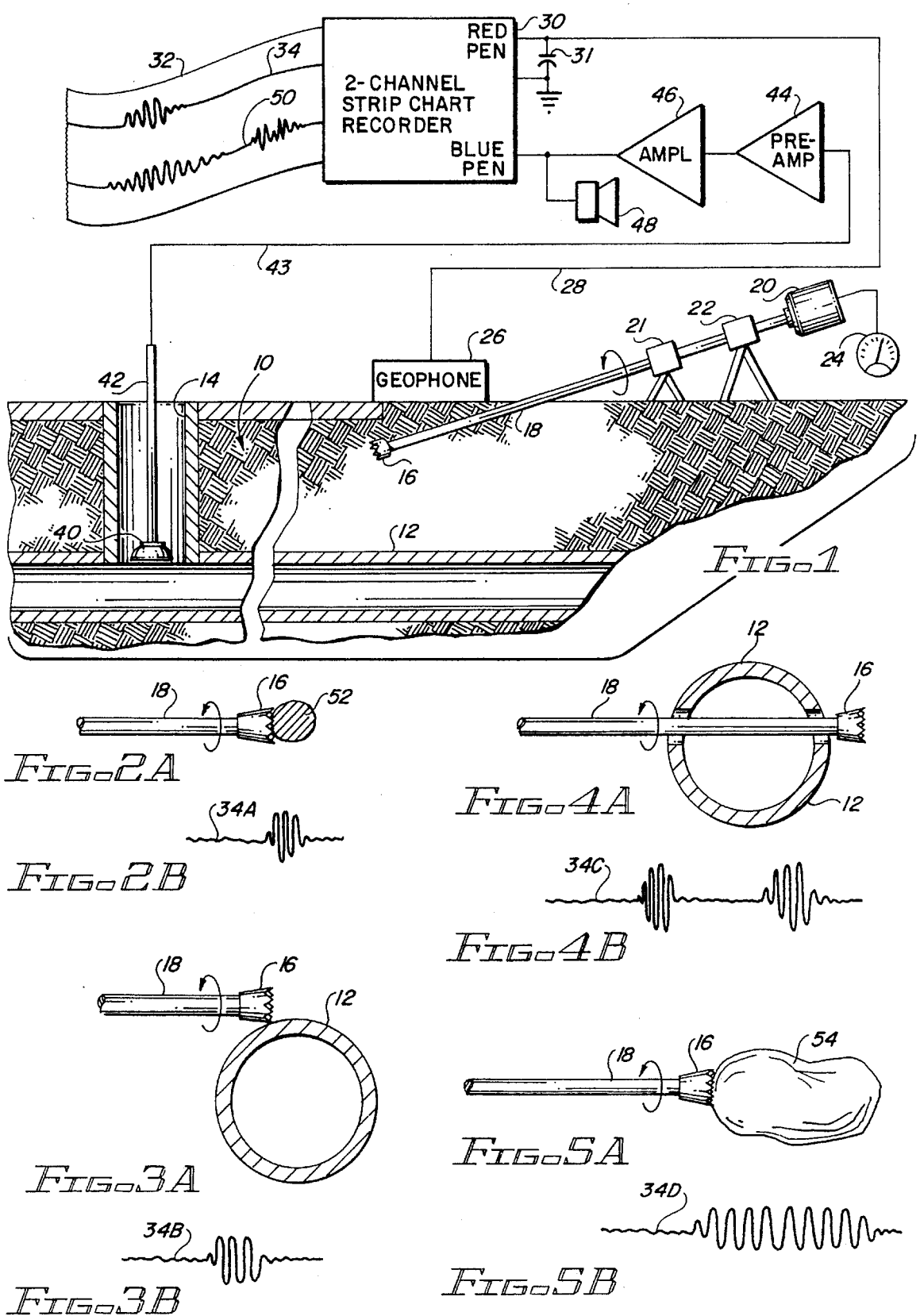

HORIZONTAL BORING PIPE PENETRATION DETECTION SYSTEM AND METHOD

BACKGROUND

Horizontal underground boring has become a popular and cost effective method for installing gas piping and other underground utilities. In such systems, a bore head or drill bit on the end of a rotating pipe stem is pushed forward through the soil by the boring machine. Typically, horizontal boring machines use drill stems in lengths of ten or twenty feet, which are added to the end of the stem as the bore head penetration continues.

Prior to the initiation of horizontal boring, it is necessary to locate electric lines, water lines, sewer lines, and other pipes in the path of the boring machine, to avoid penetrating or damaging such pipes. A first step in this process is to obtain maps of the area in which the horizontal boring is to be made, to ascertain the location of pre-existing pipes. Frequently, however, such maps are incomplete or inaccurate. All metal pipes in the path of a boring machine may be accurately located with standard electromagnetic pipe locators. Similarly, plastic pipes with tracer wires also can be accurately located. Plastic pipes without tracer wires, however, or with broken tracer wires, and other non-conductive pipes cannot easily be located. Sewer lines typically are made of clay or orangeburg pipe, or of plastic pipe, which makes such lines difficult to locate.

Systems have been developed for detecting underground sewer lines or water lines, where the pipe for such lines is not made of metal or plastic pipe with tracer wires in it. One such system for detecting the location of an underground portion of a sewer line is disclosed in Ziska U.S. Pat. No. 4,911,012. In this patent, a sound source is provided to introduce sound of a predetermined frequency into an accessible (above ground) portion of the sewer line. The sound vibration then propagates into the underground portion of the line. The location of the underground portion of the sewer line is identified by sensing the vibration through a detector located at the ground surface or inserted into the ground above the underground portion of the sewer line. A number of different locations of the detector are made in-order to "zero in" on the underground line. This system requires considerable effort; and while it is capable of tracing the path of the underground line, it is not capable of determining the depth of that line.

The Heitman U.S. Pat. No. 5,036,497 is directed to a method and apparatus for detecting the location of an underground water line. In this system, a pulsing valve is placed on the water line to cause the water intermittently to flow and to be shut off. The result is a water hammer effect in the water line to send shock waves outward from the pipe. Spaced seismic sensors are employed to provide a differential indication of the signals; and movement of the sensors to a point where the signals received by the two sensors is equal, along a spaced path, is used to trace the path of the water line. As with the system of the Ziska patent, this is a tedious and time consuming process. It also requires the insertion of the pulsing valve in order to produce the hammer effect needed to produce the seismic signals.

The Huebler U.S. Pat. No. 5,127,267 employs a system similar to that of the Ziska patent mentioned above. In the system of Huebler, an audio speaker is used to inject an audio signal into an underground pipe from an accessible above ground input. The location of the pipe then is detected by a plurality of detectors positioned at varying distances from the pipe. These detectors generate signals, which are supplied to a signal processor. The time of arrival of the acoustic signal to the various detectors then is processed to determine the detector which is located nearest the concealed pipe. This position is marked, the detectors are moved; and the test is repeated to plot or map the direction of the pipe underground. As with the systems of Heitman and Ziska above, the depth of the pipe is not ascertained by the system of Huebler.

The Alspaugh U.S. Pat. No. 2,620,386 is directed to an earth strata cutting indicator. The system of this patent is used in conjunction with a horizontal boring machine for mining coal. For such a machine, it is important to keep the machine in a layer of coal and out of adjacent strata of rock, if possible, by remote control. To determine this, sensors are provided on the bore head for transmitting signals back to an oscilloscope. The vibrations of the bore head when it is cutting through coal differ from vibrations caused when it is cutting rock strata. These vibration differences are visibly indicated on the oscilloscope; and a synchronizing system is provided between the cutting head and the indicator to provide indicia of the circular motion of the scanning tube as the bore head cuts the strata face. Thus, the precise position of the change in strata can be determined. This then permits the operator of the machine to guide it by manipulation to cut into the desired layer of coal, and to avoid rock formations.

The Jackle U.S. Pat. No. 4,457,163 utilizes acoustical (microphone) technology for detecting a broken below-grade pipe. In this system, the emission noise generated by a leak is picked up by a microphone and an amplifier, which controls a peak noise indicator. Different measuring points detected by the amplifier are supplied to a digital memory for displaying a histogram showing noise distribution along the pipe. This information then is employed to locate the leak in the pipe.

The systems of the prior art noted above and known to applicant, however, do not provide an indication to the operator of a horizontal boring machine of the penetration of the bore head or drilling bit into a sewer pipe. Consequently, it is desirable to provide a system and method for providing such an indication to the operators of a horizontal boring machine.

SUMMARY OF THE INVENTION

It is an object of this invention to provide an improved horizontal boring system.

It is another object of this invention to provide an improved method for operating a horizontal boring system.

It is an additional object of this invention to provide a penetration detection system for a horizontal boring system.

It is a further object of this invention to provide multiple sensors of different types for continuously monitoring the operation of a horizontal boring machine to provide an output indication of the penetration of the bore head into sewer pipe or the like.

In accordance with a preferred embodiment of this invention, a method and system for detecting pipe penetration by the bore head of a boring machine includes placement of a sensitive audio microphone in the nearest sewer manhole to the location of the bore head to detect acoustic signals transmitted through the ground by the bore head. This microphone produces a first output signal, which is representative of these detected acoustic signals. A seismic pick-up device or geophone is placed in a position in the vicinity of the bore head to detect vibrations of ground caused by the movement of the bore head through the ground. This seismic pick-up device produces a second output signal, which is representative of the detected vibrations caused by the movement of the bore head. The signals from the microphone and the seismic pick-up device are utilized to determine pipe penetration by the bore head, as a result of the changes in the signals detected by both the microphone and the seismic pick-up device. The nature of a pipe penetration differs from changes in signals caused by the bore head glancing off a pipe, or striking a rock or tree root.

BRIEF DESCRIPTION OF THE DRAWING

FIG. 1 is a combination diagrammatic representation and electrical block diagram of a preferred embodiment of the invention;

FIGS. 2A, 3A, 4A and 5A are diagrammatic representations of different conditions encountered by the system of FIG. 1 during its operation; and FIGS. 2B, 3B, 4B and 5B are waveform representations of signals produced in a part of the system shown in FIG. 1 for the conditions of FIGS. 2A, 3A, 4A and 5A.

DETAILED DESCRIPTION

Reference now should be made to the drawing, in which the same reference numbers are used throughout the different figures to designate the same or similar components. As illustrated in FIG. 1, a horizontal boring system is diagrammatically depicted in conjunction with a below-grade sewer pipe 12, located buried in the ground 10. The sewer pipe 12 includes spaced manholes, one of which 14 is illustrated in FIG. 1, extending from the pipe 12 to the surface or grade level in a known manner.

A standard boring machine is employed. For that reason, no details of the machine are shown; but it is represented in diagrammatic form as including a bore head 16 on the penetrating end of a drill stem or drill pipe 18, which is rotated by a motor 20 through a pair of supports or pillow blocks 21 and 22. It is to be noted that hydraulic pressure (from a source no shown) is applied to the end of the drill stem 18 to push the bore head or drill bit 16 into the ground in the direction of the elongated arrow paralleling the drill stem 18. The motor 20 rotates the drill stem 18 in the direction of the circular arrow shown in FIG. 1 to cause a pushing and rotational force to be constantly applied to the bore head 16 as it penetrates through the ground.

As illustrated in FIG. 1, the stem 18 is shown entering at an angle to the horizontal surface of the ground. It -is to be understood, however, that the bore head 16 is guided to a horizontal direction, once it has entered the ground, by means of standard technology. A pressure gauge 24 is employed in conjunction with the hydraulic mechanism pushing the drill stem 18 and bore head 16 into the ground to provide a constant indication of the amount of pressure required to move the bore head 16 forward in the drilling operation. If the bore head 16 strikes a rock or rock strata after passing through soft earth, or if it strikes a buried pipe of some type, there will be an immediate indication of a pressure increase by the pressure gauge 24.

In order to determine whether the bore head 16 penetrates a sewer pipe 12 or water pipe 12, two different types of sensors are employed. These are used in conjunction with one another to provide an indication to the operator of the horizontal boring machine of the possible penetration of the pipe 12. The first one of these sensors comprises a seismic sensor in the form of a geophone 26. In a preferred embodiment of the invention, this sensor is a one Hz Geospace® geophone. This geophone is placed on the ground 10 or inserted into the ground at a position above the location of the bore head 16.

Many variables affect the amplitude of the seismic signal produced by the rotating bore head 16. For ideal operation of the geophone or seismic pick-up device 26, undisturbed soil is the best transmission medium, as opposed to disturbed soil. Through field tests, it has been determined that the geophone 26 should be located within twenty feet from the bore head in undisturbed soil, and within ten feet in disturbed soil.

Since a typical horizontal boring machine drill stem 18 is ten feet long, the geophone 26 typically is moved ten feet ahead of the bore head 16 each time a new section of stem 18 is added during the drilling operation. Signals from the geophone 26 then are applied to one input of a two-channel strip chart recorder 30 over a lead 28, illustrated in FIG. 1. A filter capacitor 31 is connected across the geophone lines at the strip chart recorder 30 to filter out local radio station interference. In an actual embodiment of the invention, the recorder 30 is set to a sensitivity of 1 Millivolt per division for the seismic channel, indicated in FIG. 1 as coupled to the "red pen" input of the strip chart recorder. The output of the strip chart recorder 30 is a two-channel paper strip 32, with the seismic signal recorded on the strip 34, as indicated in FIG. 1.

Since the object of the invention is to detect the possible penetration of the sewer pipe 12 by the bore head 16, additional monitoring of acoustic signals in the sewer line 12 by means of a sensitive audio microphone 40 also is employed. The microphone 40 is attached to the end of a long pole (preferably an aluminum pole) 42, and is placed near the bottom of the manhole 14 to pick up sounds transmitted through the sewer line 12. The output from the microphone 40 is applied over a lead 43 to a pre-amplifier 44 and an amplifier 46 connected to the second input (blue pen) of the two-channel strip chart recorder 30. The audio signals also may be applied through a microphone 48 to provide an audible sound input to the operator of the boring machine, as well as producing an output strip 50 on the recorded two-channel strip 32 obtained from the strip chart recorder 30. A strip chart recorder which has been used in conjunction with the system shown in FIG. 1 is a two channel M-TEK®, model 222, AC/DC portable pen recorder. The recorder is operated to provide a sensitivity on the acoustic channel 50 of 200 Millivolts per division; and the chart speed of the strip chart 32 typically is set to twelve inches per hour. This chart speed, however, may be varied in accordance with the operating speed and characteristics of the horizontal boring machine.

As noted above, the seismic sensor or geophone 26 converts the vibration energy transmitted through the soil into an electrical signal, the frequency of which is sub-audio (typically, 1 Hz). Consequently, this signal must be recorded. The strip chart recorder 30 has been found to be a suitable device for making the seismic recordation on the channel 34, as described above. The seismic background signal picked up by the geophone 26 is very small. People or animals walking near the geophone 26 generate a momentary burst of energy which coincides with their steps. The system operator, however, easily can identify such steps of people or animals because they are situated in the field of vision of the operator, who can see the people or animals creating these vibrations. In addition, the actual vibration of the pen on the recorder 30 to produce the signal recorded on the strip 34 sounds very similar to the footsteps of a person walking nearby. It is important, however, for the operator to be aware of surrounding activities, which can produce signals to be picked up by the geophone 26.

The boring head 16 produces distinct seismic signals when it encounters any object that is harder than the surrounding soil. The most notable signals are due to tree roots, rocks, concrete and pipes. All of these objects cause a burst of energy when they are struck by the bore head 16. A significant distinction, however, exists when the bore head 16 penetrates both walls of a pipe 12, because this produces a distinct double burst of energy. The energy signals, which are produced by the bore head striking these different objects, are illustrated in FIGS. 2A through 5A; and the seismic signals produced by the geophone 26, for the objects of each of these figures, are illustrated in the accompanying waveforms 2B through 5B. For example, FIG. 2A illustrates the signal produced when the bore head strikes a tree root 52 to produce the output signal 34A illustrated in FIG. 2B. This signal 34A is recorded on the channel 34 of the strip chart recorder 30.

FIG. 3A indicates a glancing blow by the bore head 16 on the surface of a sewer pipe 12 to produce the signal 34B, shown in FIG. 3B. FIG. 4A indicates the situation which occurs when the bore head 16 penetrates through a sewer pipe 12. The unique double burst seismic signal 34C is produced by this occurrence. This is contrasted with the single burst signals 34A and 34B for the situations described in conjunction with FIGS. 2A and 3A. If the bore head encounters a rock in otherwise soft soil (54), the signal 34D shown in FIG. 5B is produced.

It is readily apparent from an examination of the seismic signals 34A, 34B 34C and 34D that only the penetration through the two walls of a sewer pipe 12 (or other pipe) produces the unique double burst signal 34C. The other signals, 34A, 34B, and 34D, all are single burst signals of varying lengths, depending upon the nature of the obstruction encountered by the bore head 16.

If the bore head 16 is pushing forward but is not rotating, the amplitude of the seismic signal recorded on the channel 34 of the chart 32 is greatly reduced. As a consequence, it is difficult for the system operator to detect the bore head 16 striking some object. Even if the bore head 16 is rotating, as noted above, the seismic signal may be quite weak. Because of this, the system employs two other factors to aid in detection of pipe penetration. One of these is the pressure gauge 24, which provides a constant indication of the pressure encountered by the bore head 16 against the hydraulics pushing the drill stem 18 into the ground. The machine operator can both feel and see, on the pressure gauge 24, sudden pressure increases caused by the bore head 16 striking hard objects. If the operator knows that a sewer pipe 12 is in the general area, the operator either will back up and go over the object or dig a hole to the bore head 16 to guide it over the object. Consequently, the operator attempts to feel or observe any pressure buildup as the bore head moves forward. Most tree roots, such as the root 52 (FIG. 2A) and small rocks, are not felt. Clay or orangeburg sewer lines which are in poor or deteriorated condition, however, will not be felt or noticed by the pressure gauge 24 either. The seismic sensor usually picks up these conditions, but sometimes generates a very small signal.

To complement the seismic signal recorded on the channel 34 of the strip chart recorder 30, the sensitive microphone 40 is placed at the bottom of the nearest sewer manhole 14. As is well known, the bore head 16 emits high pressure water, which serves as a lubricant during the boring process. This water noise is detected by the microphone 40, and is heard by the detection system operator over the loudspeaker 48. This background noise also is recorded by the "blue pen" of the two-channel strip recorder on the channel 50, as described above. If the bore head 16 breaks through the wall of the sewer line 12, the operator sometimes can hear the sewer lateral walls break as the bore penetrates them by the change in sound over the loudspeaker. The sound intensity significantly increases in amplitude; and this is recorded on the strip chart recorder. This low frequency amplitude envelope of the acoustic signal is recorded on channel 50 adjacent the seismic signal on the channel 34 on the chart 32 of the recorder 30. Correlation of the two signals (seismic and audio), plus possible simultaneous pressure buildup on the pressure gauge 24, indicates that a sewer lateral 12 has been penetrated if a seismic "double burst" signal 34C is recorded. If correlation between both this "double burst" seismic signal and the audio signal occurs, this generally is indicative of the penetration of a sewer lateral. If, in addition to these two signals, pressure buildup however, also is indicated on the pressure gauge 24, boring immediately is terminated; and the boring contractor digs down to the bore head to confirm the event, and then to steer the bore head 16 around the pipe 12. Repairs to the pipe 12 then can be made in an expeditious manner. As noted above, however, in not all cases will there be a pressure increase on the pressure gauge 24, even though the pipe 12 may have been penetrated, particularly if the pipe 12 is in deteriorated condition.

After periods of heavy rain, there also typically is substantial water noise in the sewer system 12/14. This can make it difficult to obtain an audio pick up of the bore penetration and water injection by the microphone 40. At times, the sewer manhole 14 is too far from the bore head 16 to hear the penetration. As a consequence, it is important for the boring contractor also to know whether sewer laterals cross the boring machine path. By knowing sewer lines 12 are in the path of the boring machine, the operator can remain more sensitive to the seismic, acoustic and pressure signals; so that any correlation of two or all three of these signals will cause the operator to stop the boring operation to dig up all suspicious contacts.

In the system shown in FIG. 1, the geophone 26 and the acoustic microphone 40 both are connected to the strip chart recorder 30 by means of small gauge speaker wires 28 and 43, which may be placed on long cable reels (such as 500 foot reels). To eliminate the necessity for stringing the wires 28 and 43, however, the geophone housing 26 can also be expanded to incorporate batteries to operate either an FM low power radio or an infrared transmitter. A similar modification may be added to the microphone pre-amp 44, which would be physically located at or near the position of the microphone 40. Complementary wireless receivers then may be installed at the chart recorder 30. Thus, the two sensors 26 and 40 will not require wires, and are easier to deploy. In addition, microprocessor based signal analyzers can replace the strip chart recorder 30 to provide an alarm or indication to the operator when the signal analysis indicates the likelihood that a pipe penetration has occurred. Similarly, a transmitter may be added to the boring machine pressure gauge 24; so that this signal can be fed to the analyzer or to the strip chart recorder (adding another channel) for inclusion in the correlation process.

Various other changes and modifications will occur to those skilled in the art to produce a system which performs substantially the same function, in substantially the same way, to achieve substantially the same result, without departing from the true scope of the invention as defined in the appended claims.

We claim:

1. A method for detecting penetration of a pipe by a bore head of a boring machine including the steps of:

placing a microphone in a sewer manhole near the bore head to detect acoustic signals transmitted through said pipe by said bore head to produce a first output signal representative of the detected acoustic signals;

placing a seismic pick-up device to detect vibrations transmitted through the ground by said bore head to produce a second output signal representative of the detected vibrations of said ground; and using said first signal from said microphone and said second signal from said seismic pick-up device to determine pipe penetration by said bore head.

2. The method according to claim 1 wherein the step of using said first and second signals comprises comparing said first and second signals.

3. The method according to claim 2 wherein said comparing said first and second signals further includes supplying said first signal from said microphone and said second signal from said seismic pick-up device to a recorder for providing a visual comparison of said signals.

4. The method according to claim 3 wherein the step of placing said microphone in said sewer manhole comprises placing said microphone near the bottom of said sewer manhole.

5. The method according to claim 4 further including the steps of pushing said bore head through the ground, monitoring the pressure encountered by said bore head as said bore head is pushed through the ground, and using indicia of increased pressure encountered by said bore head along with said first signal from said microphone and said second signal from said seismic pick-up device to determine pipe penetration by said bore head.

6. The method according to claim 1 wherein the step of placing said microphone in said sewer manhole comprises placing said microphone near the bottom of said sewer manhole.

7. The method according to claim 6 wherein the step of using said first and second signals comprises comparing said first and second signals.

8. The method according to claim 1 further including the steps of pushing said bore head through the ground, monitoring the pressure encountered by said bore head as said bore head is pushed through the ground, and using indicia of increased pressure encountered by said bore head along with said first signal from said microphone and said second signal from said seismic pick-up device to determine pipe penetration by said bore head.

9. The method according to claim 1 further including the step of moving said seismic pick-up device to a position on the ground located substantially over said bore head at periodic intervals as said bore head moves through the ground.

10. A system for detecting penetration of a pipe by a bore head of a boring machine including in combination:

an audio microphone for placement in a sewer manhole near said bore head for detecting acoustic signals transmitted through said pipe by said bore head, and for producing a first output signal representative of the detected acoustic signals;

a seismic pick-up device to detect vibrations transmitted through the ground caused by said bore head as said bore head moves through the ground to produce a second output signal representative of the detected vibrations of said ground;

apparatus producing indicia representative of said first and second output signals; and means for supplying said first and second output signals to said apparatus producing indicia representative of said first and second output signals to produce indicia of said signals as said bore head moves through said ground.

11. The combination according to claim 10 wherein said apparatus producing indicia comprises a two-channel strip chart recorder having first and second inputs, with said first output signal being supplied to the first input thereof and said second output signal being supplied to the second input thereof.

12. The combination according to claim 11 wherein said seismic pick-up device is a geophone.

13. The combination according to claim 12 further including a pressure gauge coupled with said boring machine for providing an indication of pressure encountered by said bore head as said bore head moves through said ground.

14. The combination according to claim 10 wherein said seismic pick-up device is a geophone.

15. The combination according to claim 14 further including a pressure gauge coupled with said boring machine for providing an indication of pressure encountered by said bore head as said bore head moves through said ground.

* * * * *